United States Patent [19]

Haring et al.

[11] Patent Number: 5,043,180

[45] Date of Patent: Aug. 27, 1991

[54] OXIDIZING FAT IN THE PRESENCE OF AN ANTIOXIDANT

[75] Inventors: Petrus G. M. Haring, Vlaardingen; Ronald P. Potman, Schiedam, both of Netherlands

[73] Assignee: Van den Bergh Foods Company, Division of Conopco, Inc., Lisle, Ill.

[21] Appl. No.: 454,334

[22] Filed: Dec. 21, 1989

[30] Foreign Application Priority Data

Dec. 23, 1988 [EP] European Pat. Off. ........ 88203002.6
Sep. 29, 1989 [EP] European Pat. Off. ........ 89202458.9

[51] Int. Cl.$^5$ ............................................. A23L 1/226
[52] U.S. Cl. ................................... 426/533; 426/613; 426/650; 426/541
[58] Field of Search ................ 426/533, 613, 541–547, 426/650

[56] References Cited

U.S. PATENT DOCUMENTS

| | | |
|---|---|---|
| 4,411,924 | 11/1988 | Sevenants . |
| 4,414,229 | 11/1983 | Bakal et al. ............... 426/613 X |
| 4,604,290 | 8/1986 | Lee et al. ...................... 426/533 |
| 4,820,538 | 4/1989 | Schulman et al. .............. 426/533 |

FOREIGN PATENT DOCUMENTS

| | | |
|---|---|---|
| 0233378 | 8/1987 | European Pat. Off. . |
| 0298552 | 1/1989 | European Pat. Off. . |
| 836108 | 6/1960 | United Kingdom . |

OTHER PUBLICATIONS

Arefander, Perfume and Flavor Chemicals, vol. II, 1969, Published by the Author: Montclair, N.J., Monograph, Nos. 2343, 3052, 3053.

Chemical Abstracts, vol. 104, No. 21, Abstract No. 185063E.

Asian J. Dairy Res., 3 (3): 127–130 (1984).

Milchwissenschaft, vol. 41, No. 8, pp. 479–482 (1986).

*Primary Examiner*—Joseph Golian
*Attorney, Agent, or Firm*—Rimma Mitelman

[57] ABSTRACT

The present invention is concerned with a flavor concentrate mainly consisting of glyceride fat and containing at least 0.6 ppm n-pentanal and/or at least 0.1 ppm n-nonanal and anti-oxidant at a concentration level in the range of 1 to 100 times c*. The present flavor concentrate may suitable be used to flavor food products.

Another aspect of the present invention is a process for preparing a flavor concentrate by mildly oxidizing a fat-containing composition, comprising:

(a) adding anti-oxidant to a fat-containing composition at a concentration level, calculated on the fat, of at least 1 to 100 times c*, (b) keeping the composition, in the presence of water, at a temperature of more than 50° C. and at most the boiling temperature of the water under the conditions applied, during a period of time ranging from 0.5 hours to 1 week. The present process may not only beneficially be employed in the preparation of flavor concentrates from a butterfat containing composition but also by the oxidation of materials containing animal and/or vegetable fat.

Other aspects of the present invention are a process for flavoring food products and a flavored food product obtainable by such a process.

3 Claims, No Drawings

OXIDIZING FAT IN THE PRESENCE OF AN ANTIOXIDANT

The present invention is concerned with a flavour concentrate, a process for preparing a flavour concentrate, a process of flavouring food products and flavoured food products. Here, by the term flavour both the odour and the taste impression are meant.

The addition of flavour concentrates to food products to impart a desirable flavour thereto is well known in the art. In general concentrates comprise a mixture of individually prepared flavour compounds/components, and are added to food products at low concentration levels. When such flavour concentrates, composed of individually prepared compound/components, are used to imitate a natural flavour, e.g. the flavour of butter, generally the flavour obtained is perceptibly different from the flavour imitated.

It is furthermore known in the art to add butter or butterfat to food products, such as margarine, to transfer to these food products the butter flavour derived from the butter or the butterfat. A disadvantage of adding butter or butterfat is that in this manner, depending on the amount added, only a butter flavour of limited intensity can be imparted to food products. It is, of course, possible to complement the flavour derived from butter or butterfat by using a mixture of flavour compounds but, as already indicated above, such addition has the disadvantage that no balanced butter flavour can be obtained, as a result of which the flavour obtained differs perceivably from the natural butter flavour.

In co-pending, not prior published European Patent Application No. 88201374.1 it is described that a balanced butter flavour can be imparted to food products by adding oxidized butterfat. Said application particularly relates to a process for preparing a flavoured food product by adding to edible material at least 0.05% (w/w) oxidized butterfat having an n-pentanal content of more than 0.5 ppm and/or a 2-transnonenal content of more than 0.05, more preferably of more than 0.1 ppm.

In said co-pending application it is explained that an advantage of the addition of oxidized butterfat to food products is that in this manner a butter flavour can be imparted to such products that cannot, or barely, be distinguished from the flavour of natural butter. Said butter flavour is moreover obtained in a more effective way than by the addition of non-oxidized butter or non-oxidized butterfat, since less oxidized butterfat is required for obtaining the same flavour intensity than in case non-oxidized butterfat were used instead.

Like the above mentioned European patent application, the present invention relates to the favourable flavour boost that, unexpectedly, can be obtained by mild oxidation of fatty materials. We have found now that a more concentrated flavour concentrate may be obtained by a more controllable route by mildly oxidizing butterfat in the presence of an anti-oxidant.

We have furthermore found that flavour concentrates of high quality can be obtained if, instead of butter, fatty materials of non-dairy origin are used, e.g. lard and chicken fat. Thus, in a first aspect, the present invention is concerned with a process for preparing a flavour concentrate by mildly oxidizing a fat-containing composition, comprising:

(a) adding anti-oxidant to a fat-containing composition at a concentration level, calculated on the fat, of at least $c^*$, (b) keeping the fat-containing composition, in the presence of water, at a temperature of at least 50° C. and at most the boiling temperature of the water under the conditions applied, during a period of time ranging from 0.5 hours to 1 week, preferably of less than 60 hours. Process step (b) in accordance with the present invention is carried out subsequent to the addition of the anti-oxidant.

The anti-oxidant used in the process according to the invention may either be one single compound having anti-oxidative properties, or a mixture of different compounds which in combination give an anti-oxidative effect.

Throughout this document, $c^*$ indicates the concentration level, by weight of fat, at which the particular anti-oxidant or mixture of anti-oxidants, when added to the fat utilized in the preparation of the flavour concentrate, increases the induction period of said fat or fat blend by a factor of at least 1.5. Whenever referred to in this document, unless indicated otherwise, the term induction period refers to the induction period measured at 100° C., using the method described in J.Am.Oil.Chem.Soc. Vol. 63, 6 (1986), 192-195.

Since fats, such as butterfat, can contain small amounts of anti-oxidative compounds, e.g. alpha-tocopherol, when determining the $c^*$-value for a particular compound or mixture of compounds, the anti-oxidant naturally present in the fat is disregarded. In general the alpha-tocopherol content of butterfat ranges from 20 to 40 ppm.

According to a preferred embodiment of the present process, the anti-oxidant content utilized, by weight of the fat, is in the range of 1 to 100 times $c^*$, more preferably 2 to 50 times $c^*$. According to yet another preferred embodiment the anti-oxidant used in the present process has a $c^*$-value below 0.1%, preferably below 0.05% by weight of the fat.

It is important that the same fat is used in assessing the anti-oxidative effect of a particular anti-oxidant as is used in the present process. Indeed fats are natural materials that, depending on their origin, may vary in composition and characteristics and therefore the induction period and influence of anti-oxidant thereon may vary with the origin of the fat material used.

By oxidizing fat in the presence of an anti-oxidant, the oxidation process is retarded and moreover relatively few off-flavour generating compounds are formed, in favour of flavour compounds which positively attribute to the flavour of the concentrate. Because the oxidation process is retarded it is easier to stop the process at the right stage, i.e. after substantial amounts of desired flavour compounds have been formed and before large amounts off-flavours are generated after the induction period has ended. In practice the anti-oxidative effect of particular anti-oxidants may suitably be derived from their effect on the length of the induction period of a particular fat or fat blend.

The present process is directed to the mild oxidation of fat in the presence of water. The present invention encompasses the mild oxidation of fat-in-water emulsions (such as cream or milk) as well as water-in-fat emulsions. When oxidizing under mild conditions, aldehydes, such as n-pentanal, n-hexanal, n-heptanal, n-nonanal and 2-trans-nonenal, are believed to be formed from unsaturated fatty acid residues and unsaturated free fatty acids. Although the positive flavour of the flavour concentrates obtained in the present process is not necessarily originating from the formation of aldehydes like n-pentanal and n-nonanal, we have found that the an acceptable concentrate can only be obtained if the process of preparing said concentrate involves the generation of substantial amounts of these aldehydes.

As the present process may also be carried out at high pressure, the temperature at which the oxidation is initiated may be substantially higher than the boiling temperature of water at atmospheric pressure, i.e. much higher than 100° C. One aspect of the present process is to keep the fat-containing composition at a temperature of more than 50° C. and less than the boiling temperature of the water under the conditions applied. Another aspect of the invention is to keep the fat-containing composition at the boiling temperature of the water under the conditions applied.

The present process not only encompasses the mild oxidation of butterfat-containing compositions but also of compositions containing animal fats and/or vegetable fats. Suitable animal fats that may be utilized in the present process are chicken fat, salmon oil, lard and tallow. Also vegetable fats like peanut oil, sesame oil and olive oil may beneficially be used in the present process. In case the aforementioned fats are used in the present process a substantial boosting of the flavour of these oils is obtained. Even refined, essentially flavourless oils may successfully be utilized in the present process as flavour compounds are generated during the process.

According to a preferred embodiment of the invention, the fat-containing composition employed in the present process contains at least 20 wt. % fat, more preferably it contains at least 60 wt. % fat. The fat present in the fat-containing composition employed in the present process, preferably, comprises at least 60 wt. %, more preferably at least 90 wt. % of a fat selected from the group consisting of: butterfat, animal fat, olive oil, sesame oil and peanut oil.

As the present process aims at the mild oxidation of fat, the flavour concentrate obtained should preferably have a peroxide value of less than 20, more preferably of less than 12. Generally the peroxide value of the present flavour concentrate exceeds 2. The peroxide value indicates the amount of peroxides present in the fat and is expressed in mili-equivalent oxygen per kg fat. The way in which the peroxide value can be determined is described by P. G. Powick, J. Agric. Res. 26, 323 (1923).

Examples of anti-oxidants which may suitably be applied in the present process are:

(1) natural and nature-identical anti-oxidants such as tocopherols, tocotrienols, gum guaiac, nordihydroguairetic acid, ascorbic acid and (2) synthetic anti-oxidants like butylated hydroxyanisole (BHA), butylated hydroxytoluene (BHT), tertiary butyl hydroxyquinone (TBHQ), trihydroxybutyrophenone, 4-hydroxymethyl-2,6ditertbutylphenol, dilaurylthiodipropionate, gallates, anoxomer (a condensation product of BHA, BHT and TBHQ), ascorbyl palmitate and (3) sequestrants such as tartaric acid, citric acid and ethylenediamine tetra-acetic acid (EDTA).

Preferably the anti-oxidant(s) used in the present process are selected from the group consisting of natural, nature-identical anti-oxidants, citric acid, tartaric acid and precursors thereof. The present invention also encompasses the application of extracts of natural materials as anti-oxidant. Examples of suitable extracts having anti-oxidative properties are: extracts of tea, rosemary and thyme.

Since the present process produces rather volatile flavour compounds, preferably said process is carried out in an essentially closed system, i.e. a system from which such volatile compounds cannot escape. The term closed system as used here encompasses, for instance, reflux systems. A closed system also offers the advantage that conditions may be chosen such that the water present in the fat-containing composition as well as the volatiles generated will not completely evaporate from said composition.

According to a preferred embodiment of the present process, the fat-containing composition is kept at a temperature of at least 85° C. during at least 1 hour. Particularly good and reproducible results are obtained in the present process if the oxidation is carried out under reflux conditions.

As the presence of at least a small amount of water in the present process was found to be advantageous, preferably the fat-containing composition contains at least 2 wt. % of water, more preferably from 4 to 25 wt. % of water. In the present process usually water is admixed to essentially water-free fat and the mixture so obtained is mildly oxidized in accordance with the present invention. When preparing a flavour concentrate on the basis of butterfat we have found it beneficial to prepare a fat-containing composition on the basis of butterfat and water, rather than on the basis of butter. It is believed that ingredients present in the aqueous phase of butter, e.g. lactose and milk protein, upon heating generate undesirable flavours which are reminiscent of cooked butter.

In yet an even more preferred embodiment the fat-containing composition contains a metal salt, preferably a metal salt selected from the group consisting of alkali metal salts, alkaline earth metal salts and mixtures thereof. Most preferably the metal salt used in the present process is selected from the group consisting of sodium salt, potassium salt and mixtures thereof. The presence of a salt in the water present in the fat-containing composition has a favourable effect on the flavour boost obtained through oxidation. Preferably the fat containing composition contains at least 1%, more preferably 3-40% of salt by weight of the water present therein.

Suitably the present process employs a fat-containing composition that is mainly composed of water and fat and accordingly in a preferred embodiment the fat-containing composition contains at least 80 wt. % water and fat.

The present process can suitably include a step in which the flavouring volatiles present in the oxidized fat are separated from said fat. Such separation may be effected, for instance, by distillation, super critical gas extraction or solvent extraction. According to a preferred embodiment the volatiles are extracted from the oxidized fat by means of distillation, yielding a distillate containing at least 5 ppm heptanal and 1 ppm nonanal. According to one embodiment of the invention, the volatile flavours can be distilled off after the oxidation treatment has ended. Alternatively the fat can be oxidized and volatiles generated during oxidation can be distilled off simultaneously. In the latter embodiment heating serves the purpose of both enhancing oxidation and evaporating the volatiles from the fat.

Yet another aspect of the present invention is a flavour concentrate obtainable by the process described above. Preferably the flavour concentrate is directly obtained from the process according to the present invention.

The present invention also embodies a concentrate mainly consisting of mildly oxidized glyceride fat, containing: (a) n-pentanal and n-nonanal at a substantially higher concentration level, preferably at a concentration level 5 times higher than the nonoxidized glyceride fat and (b) anti-oxidant at a concentration level of at least $c^*$. Preferably the concentrate contain anti-oxidant at a concentration level in the range of 1 to 100 times $c^*$, more preferably in the range of 2 to 50 times $c^*$.

Here by the term glyceride fat is meant a fat essentially consisting of free fatty acids, mono-, di- and/or triglycerides. Preferably the glyceride fat essentially consists of di- and/or triglycerides, more preferably, the glyceride fat essentially consists of triglycerides.

The glyceride fat in the flavour concentrate of the present invention, preferably, comprises at least 60 wt. %, more preferably at least 90 wt. % of a fat selected from the group consisting of: butterfat, animal fat, olive oil sesame oil and peanut oil. The term butterfat as used here encompasses each fat of dairy origin, e.g. fat present in milk, cream etc. According to a very preferred embodiment of the invention the flavour concentrate contains at least 90 wt. % of a fat selected from the group consisting of: butterfat, lard, tallow, chicken fat, salmon oil, olive oil, sesame oil and peanut oil.

According to one embodiment of the invention the glyceride fat in the flavour concentrate is butter fat and contains at least 1.5 ppm n-pentanal and/or at least 0.5 ppm n-nonanal. In another embodiment the glyceride fat is selected from the group consisting of lard, tallow and mixtures thereof and contains at least 1.0 ppm n-pentanal and/or at least 0.5 ppm n-nonanal. According to yet another embodiment the glyceride fat in the flavour concentrate is chicken fat and contains at least 2.0.ppm n-pentanal and/or at least 2.0 ppm n-nonanal.

According to a very preferred embodiment of the invention the glyceride in the flavour concentrate is butterfat and contains at least 2.0 ppm n-pentanal and/or more than 0.8 ppm n-nonanal. As observed above, a butterfat-based flavour concentrate, preferably, is prepared from an emulsion obtained through the admixture of butterfat and water, rather than through mild oxidation of butter comprising an aqueous phase containing milk protein and lactose. Accordingly, in case the glyceride fat in the present flavour concentrate is butterfat, said concentrate preferably contains in combination less than 1.0 wt. % of lactose and milk protein, more preferably even less than 0.6 wt. % of lactose and milk protein.

Such a flavour concentrate, preferably, contains more than 0.8, more preferably more than 1.0 ppm n-hexanal.

Alpha-tocopherol is a compound, normally present in butter, to which anti-oxidative properties are attributed. In case alpha-tocopherol is the only anti-oxidant present in the flavour concentrate according to the invention, preferably said compound is present at a concentration level of at least 40 ppm, more preferably of at least 60 ppm. Most preferably the present flavour concentrate contains at least 100 ppm alpha-tocopherol. Alternatively the present flavour concentrate contains an added anti-oxidant other than alpha-tocopherol and preferably contains at least $c^*$, more preferably from 1 to 100 times $c^*$ of said other anti-oxidant.

Yet another aspect of the invention is a process of flavouring food products by adding at least 0.05% (w/w) of a flavour concentrate obtained by the present process to an edible material. Here the edible material preferably is a food product.

By food products are understood: products which are suitable, and intended, for human consumption, i.e. products which are non-toxic when consumed in normal amounts. Examples of food product which are particularly suitable for being flavoured by means of the present oxidized fat containing concentrates are: spreads, nondairy creams, confectionery, ice cream. syrups, bakery materials, bakery products, shortenings, gravies, soups, sauces, dressings and snacks.

As the flavour concentrate obtained by the present process has a relatively strong flavour, preferably 0.05-20% (w/w), more preferably 0.1-5% (w/w), calculated on the food product, of the flavour concentrate is added to the edible material in the process of the present invention. In order to obtain a flavoured food product of optimal quality, it is advisable that the flavour concentrate be mixed homogeneously with the edible material. By a homogeneous distribution it is avoided that certain parts of the food product will contain such high concentration levels of the concentrate that an unpleasant flavour is imparted thereto.

The flavour compounds formed during oxidation of butterfat are believed to mainly originate from the unsaturated fatty acid residues present in said butterfat. Thus it may be beneficial to apply fractions of butterfat which are enriched in unsaturated fatty acid residues. An example of a butterfat fraction having a relatively high content of unsaturated fatty acid residues is the fat found in buttermilk and butter serum.

The edible material used in the process according to the present invention is preferably not oxidized. In case the edible material is (partly) oxidized, the flavoured food product is likely to have an off-flavour as in general oxidation of edible material results in the formation of off-flavours. If a food product obtained by the present process comprises both flavour compounds, formed during the oxidation of the edible material, and flavour compounds originating from the oxidized fat, said product will not have a pleasant balanced flavour.

In the present process of flavouring food products, preferably oxidized butterfat is mixed with water and a non-oxidized fat such that a stable emulsion is obtained. The emulsion obtained can, for example, be a water-in-oil emulsion, an oil-in-water emulsion, but also an oil-in-water-in-oil emulsion, in which the water can also be present in the form of ice.

Food products that can be obtained in the form of a stable emulsion according to the above-mentioned process are, for example, spreads, such as margarine and reduced-fat spreads. Preferably, the oxidized butterfat, the water and the non-oxidized fat are mixed in ratios such that the food product obtained contains 10-95% (w/w) water and 5-90% (w/w) fat, and the total water and fat content is at least 70% (w/w). Examples of such a food product are a spread containing 10% (w/w) oxidized butterfat, 70% (w/w) (non-oxidized) vegetable fat and 20% (w/w) water, and a spread containing 5% (w/w) oxidized butterfat, 35% (w/w) non-oxidized butterfat and 60% (w/w) water (assuming that the components dissolved in the various components, such as colourant and emulsifiers, form part of these components).

The terms fat and oil are used interchangeably in this document. Both by fat and oil is meant a triglyceride composition or a non-toxic material having properties comparable with those of triglycerides, which material may be indigestible, such as, for instance, jojoba oil or esters of fatty acids and sugars.

The non-oxidized fat used in the process according to the present invention preferably has a peroxide value of less than 2, more preferably of less than 1. Furthermore, non-oxidized fats which are suitable for use in food products generally have an anisidine value of less than 1 and a total oxidation value of less than 5. The way in which the anisidine value can be determined is described in IUPAC, Standard Methods for the Analysis of Oils, Fats and Derivatives, 6th Ed. (1979), Pergamon Press, Oxford, Method 2,504, page 143. The total oxidation value (TOV) is calculated from the peroxide value (PV) and the anisidine value (AV) as follows: TOV=2*PV+AV. This formula for calculating the TOV is described in J.Am.Oil.Chem.Soc. 51, 17 (1974) G. R. List et al.

A further aspect of the present invention is a flavoured food product obtainable by a process according to the present invention.

The incorporation of oxidized butterfat is particularly beneficial for products containing a limited amount of butterfat, or no butterfat at all. Thus preferably the food product, obtainable by the present process, comprises less than 30 wt. %, more preferably even less than 10 wt. % of butterfat.

Although conventional food products upon storage under oxidative conditions may be oxidized to some extent, such products, even when containing oxidation products like aldehydes at substantially the same concentration level as a food, product flavoured by a flavour concentrate obtained by the present process, do not have a pleasant flavour. The present food products are clearly distinct from such oxidized food products in that the oxidation products are already present in the product immediately after manufacture. Thus the present flavoured food product, while containing significant amounts of compounds obtained by the oxidation of fat, preferably has not been stored for longer than 10, more preferably not longer than 5 days.

The present invention also encompasses the use of a flavour concentrate obtainable by the process as described hereinbefore, for flavouring food products.

The invention is illustrated by the Examples below.

EXAMPLE 1

12.5 kg butterfat is mixed with 2.5 kg tap water containing 10% (w/w) salt (sodium chloride) and 2.5 g mixed tocopherol (ex Riken Vitamin Co. Ltd. 70% on oil) containing alpha-, beta-+gamma- and delta-tocopherol in a weight ratio of 28:48:19. The mixture is heated in a closed flask at a temperature of 90° C., while stirring. After 16 hours, the water is separated from the fat with the aid of a centrifuge.

The oxidized butterfat had a peroxide value of 2.0.and contained 8.9 ppm pentanal, 1.9 ppm hexanal, 2.3 ppm heptanal, 0.7 ppm nonanal and 0.8 ppm 2-transnonenal.

The butterfat oxidized in the above manner is subsequently used in the preparation of a margarine comprising a fat phase consisting of 0.5% (w/w) oxidized butterfat and 80% (w/w) vegetable fat. In addition, another margarine is prepared which is identical with the above-mentioned margarine except that, instead of the 0.5% oxidized butterfat, it contains the same amount of non-treated butterfat. Furthermore, both margarine products contain a conventional flavour composition.

An expert panel consisting of 10 persons evaluated the butter taste of both products. None of the 10 panelists found that the product without oxidized butterfat had a butter-like taste. On the other hand, 7 of the 10 panelists found that the product with oxidized butterfat had a taste reminiscent of butter. The induction period of the original butterfat was found to be 14.7 hours (at 100° C.).

EXAMPLE 2

250 g of butterfat (ex Frico TM, the Netherlands) was mixed with 50 g tap water containing 10% (w/w) salt and 25 mg dodecylgallate. The mixture is heated in a closed flask at a temperature of 90° C. while stirring. After 16 hours the water is separated from the fat with the aid of a centrifuge.

The above procedure was repeated, with the exception that, instead of dodecylgallate, BHT (25 mg), Propylgallate (25 mg), TBHQ (25 mg) and no added anti-oxidant were used. The flavour concentrates thus obtained were analyzed and the results so obtained are represented in the following table:

|  | Peroxide Value | $C_5$-al | $C_6$-al | $C_7$-al | $C_9$-tr* |
|---|---|---|---|---|---|
| Dodecylgallate | 1.4 | 6.8 | 2.5 | 1.4 | 0.5 |
| BHT | 1.2 | 5.8 | 1.3 | 0.8 | 0.8 |
| Propylgallate | 1.2 | >6 | 2.8 | 1.3 | 0.4 |
| TBHQ | 1.9 | 6.0 | 3.5 | 1.7 | 0.3 |
| No anti-oxidant | 1.5 | 4.0 | 1.7 | 2.7 | 0.8 |
| Non-treated butterfat | 0.2 | <0.1 | <0.2 | <0.1 | <0.1 |

*$C_5$-al = n-pentanal
$C_6$-al = n-hexanal
$C_7$-al = n-heptanal
$C_9$-tr = 2-trans-nonenal The aldehyde contents were measured by means of a TCT (thermal cold trap injector ex Chrompack TM) dynamic headspace method and separation on a 0.32 mm capillary column (CP Sil 88). In the Examples below the methyl ketone contents were measured by means of the same method and equipment.

Samples of the product to be analyzed were put onto methylchlorosilane-treated glass wool (ex. Hicol). Using the thermal cold trap injector, the volatiles were injected into a GLC-apparatus (UT Packard 436 S) equipped with a FID-detector. During the analysis conditions were chosen such that the degradation of hydroperoxides present in the sample is avoided. Thus the temperature to which the sample is subjected during analysis is kept as low as possible. The concentration levels were determined on the basis of a calibration curve obtained using ten calibration mixtures containing 0.5–20 ppm of the aldehydes and ketones.

The oxidized butterfat compositions were compared by an expert panel consisting of 6 persons. The concentrates were dissolved at 1% (w/w) in a flavourless oil containing a high amount of medium chain triglycerides. All members of the panel found that the oil containing the concentrate obtained by oxidation in the absence of an anti-oxidant had a clearly distinguishable off-flavour whereas the other flavoured oils had a clearly perceptible butter-like taste and odour.

EXAMPLE 3

0.7 kg butterfat ex Frico, the Netherlands, to which 286 ppm of a mixed tocopherol composition (ex Riken Vitamin co. Ltd., 70% in oil) had been added, was melted with the aid of a microwave oven. C* for the combination of butterfat and tocopherol used, was found to be 19 ppm. 175 g of a 16% (w/w) salt solution, made using demineralised water, was added to the butterfat. The emulsion was heated, under reflux conditions (103° C.), in a 3-necked-roundbottomed 1 l. flask equipped with a reflux condenser. The flask was placed in a 115° C. oil bath and the mixture was continuously stirred (emulsion necessary). After 16 hours, the salty solution was separated from the butterfat with the aid of a centrifuge.

The concentration levels of several aldehydes and methyl ketones in the oxidized butter fat were determined using the TCT method described in Example 2 with the exception that the column used had a bore of 0.25 mm. The aldehyde concentrations were obtained by averaging the figures obtained from 6 independent analyses. The methyl ketone concentrations were obtained from 3 independent analyses. The mean concentrations found as well as the standard deviations (SD) in these means are given below.

| Compound | Concentration (ppm) | S.D. |
|---|---|---|
| Pentanal | 4.53 | 0.63 |
| hexanal | 1.91 | 0.37 |
| heptanal | 4.07 | 0.40 |
| octanal | 0.76 | 0.26 |
| nonanal | 3.15 | 1.17 |
| 2tr-nonenal | 0.59 (3 analyses) | 0.02 |
| pentanon-2 | 7.33 | 0.16 |
| heptanon-2 | 20.63 | 0.93 |
| nonanon-2 | 12.14 | 1.05 |
| undecanon-2 | 16.71 | 2.11 |
| tridecanon-2 | 27.85 | 2.30 |

The oxidized butterfat was found to have a peroxide value of 2.7 and an anisidine value of 3.4.

Three margarine products were prepared on the basis of the following formulation:

| Ingredient | % by weight |
|---|---|
| Fat phase based on vegetable fat | 79.5 |
| Salt | 0.4 |
| Ethanol-soluble fraction of lecithin | 0.2 |
| Monoglycerides (from palm oil hardened to a slip melting point of 58° C.) | 0.1 |
| Skim milk powder | 0.5 |
| Potassium sorbate | 0.1 |
| Water | 19.2 |
| pH adjusted with citric acid to 4.5 | |
| Commercial butter flavour concentrate* | 50 ppm |
| Beta carotene | 5 ppm |

*containing butanoic acid, delta-lactones, 4-cis-heptenal, methyl ketones and demethyl sulfide Margarine A had a composition exactly as described above. Margarine B had the same formulation as margarine A with the exception that the fat phase contained 1% of the mildly oxidized butterfat by weight of product. Margarine C had the same formulation as margarine B with the exception that instead of mildly oxidized butterfat non-oxidized butterfat of the same origin was used.

When the above three margarine products were compared in a so called blind test, margarine B was clearly preferred over the other products. The panel members preferred margarine B in particular because of its lingering aftertaste.

Yet three more margarine products were products made on the basis of a formulation which was very similar to the one described above. Margarine D contained no added butterfat, whereas margarine E contained 3.0 wt. % of the mildly oxidized butterfat and margarine F contained 3.0 wt. % of non-oxidized butterfat.

250 g of the above margarine products was melted, 250 g sugar was added and the ingredients were thoroughly mixed. Subsequently 250 g of eggs were mixed in followed by 250 g of flour. The three batters so obtained were poured into cake forms and separately baked for about 1 hour at 175° C.

When evaluating the odour coming out of the oven and the flavour of the baked products, the products made with butterfat containing margarine were preferred over the other product with a slight preference for the product containing the mildly oxidized butterfat.

EXAMPLE 4

A low fat spread A was prepared in a conventional manner from the following ingredients:

| Ingredient | % by weight |
|---|---|
| Butter | 47.6 |
| Butterfat (used to dissolve ingredients) | 0.5 |
| Hymono 8803 (monoglycerides) | 0.3 |
| Beta carotene (20% solution) | 0.002 |
| Commercial flavour concentrate* | 0.005 |
| Gelatin | 3.0 |
| Skim milk powder | 0.28 |
| Salt | 0.16 |
| Potassium sorbate | 0.12 |
| Citric acid | 0.018 |
| Lactic acid | 0.07 |
| Water (pH = 4.8) | 47.9 |

*containing butanoic acid, delta-lactones, 4-cis-heptenal, methyl ketones and demethyl sulfide A low fat spread B was made using the same ingredients as in spread A, with the exception that 1 wt. % butterfat was replaced by 1 wt. % of the mildly oxidized butterfat of Example 3. An expert panel having tasted both spreads unanimously preferred spread B, i.e. the spread containing 1 wt. % oxidized butterfat.

EXAMPLE 5

Example 3 was repeated with the exception that 0.400 wt. % of the mixed tocopherol composition was added and that no salt was used. The concentration levels of various aldehydes and methyl ketones in the oxidized butter fat were determined using the TCT method as in Example 3.

| Compound | Concentration (ppm) | S.D. |
|---|---|---|
| Pentanal | 1.39 | 0.13 |
| hexanal | 0.42 | 0.10 |
| heptanal | 0.51 | 0.12 |
| octanal | 0.18 | 0.04 |
| nonanal | 0.89 | 0.17 |
| 2tr-nonenal | 0.17 | 0.02 |
| pentanon-2 | 4.34 | 0.12 |
| heptanon-2 | 11.58 | 3.11 |
| nonanon-2 | 8.58 | 1.03 |
| undecanon-2 | 9.08 | 1.19 |

| Compound | Concentration (ppm) | S.D. |
|---|---|---|
| tridecanon-2 | 10.92 | 2.88 |

EXAMPLE 6

0.7 kg steam deodorized chicken fat was melted in a microwave oven and mixed with 0.800 g of a tocopherol composition (ex. Ricken Vitamin co. Ltd., 70% in oil). 175 g of a 16% (w/w) aqueous salt solution, made using demineralised water, was added to the chicken fat. C* for the combination of chicken fat and tocopherol composition used, was found to be 36 ppm. The emulsion so obtained was heated in a 3-necked-roundbottomed 1 litre flask equipped with a reflux condenser at reflux temperature. The flask Was placed in a 115° C. oil bath and the mixture was continuously stirred. After 12-16 hours, the salty solution was separated from the chicken fat with the aid of a centrifuge.

Using the TCT method as described in Example 3, in the oxidized chicken fat the following aldehyde concentrations were measured, based on three independent analyses of the aldehyde contents:

| Compound | Concentration (ppm) | S.D. |
|---|---|---|
| Pentanal | 7.64 (0.50)* | 0.81 (0.06) |
| hexanal | 12.43 (1.68) | 0.24 (0.03) |
| heptanal | 2.86 (0.11) | 0.64 (0.08) |
| octanal | 1.01 (0.29) | 0.23 (0.07) |
| nonanal | 7.06 (0.60) | 1.64 (0.09) |
| 2tr-nonenal | 0.00 (0.00) | 0.00 (0.00) |

*Between brackets the aldehyde concentration in the original deodorized chicken fat is given.

The mildly oxidized chicken fat was included in a conventional instant chicken soup mix at a concentration level of 2 wt. %. When dissolved in hot water (14.52 g per 175 ml) and compared with a instant chicken soup mix containing non-oxidized chicken fat the soup containing oxidized chicken fat was preferred by most panel members.

EXAMPLE 7

0.7 kg lard (ex Bebo Smilfood, Heerenveen, the Netherlands) was melted in a microwave oven and mixed with 0.175 g mixed tocopherol (ex Riken Vitamin co. Ltd. 70% in oil). C* for the combination of lard and tocopherol composition used, was found to be 22 ppm. 175 g of a 10% (w/w) aqueous salt solution, made using demineralised water, was added to the lard. The emulsion was heated to 90° C. in a 3-necked-roundbottomed 1 l. flask equipped with a reflux condenser. The flask was placed in a 95° C. oil bath and the mixture was continuously stirred. After 16 hours, the salty solution was separated from the lard with the aid of a centrifuge.

Using the TCT method as described in Example 3, the following aldehyde and methyl ketone concentrations were measured:

| Compound | Conc. (ppm) | S.D. |
|---|---|---|
| pentanal | 3.59 (0.47) | 1.29 (0.16) |
| hexanal | 4.54 (1.51) | 0.05 (0.60) |
| heptanal | 3.16 (0.12) | 0.15 (0.16) |
| octanal | 0.90 (0.15) | 0.03 (0.05) |
| nonanal | 3.25 (0.58) | 0.12 (0.08) |
| 2tr-nonenal | 0.31 (0.00) | 0.06 (0.00) |
| pentanon-2 | 0.00 | 0.00 |
| heptanon-2 | 0.42 | 0.30 |
| nonanon-2 | 0.31 | 0.31 |
| undecanon-2 | 0.12 | 0.14 |
| tridecanon-2 | 0.75 | 1.01 |

*Between brackets the aldehyde concentration in the original lard is given.

The oxidized lard was found to have a peroxide value of 9 and an anisidine value of 12.6.

A fat blend consisting of 20 g of the above mildly oxidized lard and 980 g of a partially hydrogenated vegetable fat was used in the preparation of a conventional margarine. The product obtained had a clearly perceptible lard flavour.

EXAMPLE 8

0.7 kg of the same lard as in Example 7 was melted with the aid of a microwave oven and subsequently mixed with 0.400 g mixed tocopherol (ex Riken Vitamin co. Ltd., 70% in oil). 175 g of a 16% (w/w) aqueous salt solution, made using demineralised water, was admixed to the lard. The emulsion so obtained was refluxed in a 3-necked-roundbottomed 1 l. flask equipped with a reflux condenser at a temperature of 103° C. The flask was placed in a 115° C. oil bath and the mixture was continuously stirred. After 16 hours, the salty solution was separated from the lard with the aid of a centrifuge.

Using the TCT method as described in Example 3, the following aldehyde and methyl ketone concentrations were measured:

| Compound | Conc. (ppm) | S.D. |
|---|---|---|
| pentanal | 9.42 | 0.50 |
| hexanal | 8.88 | 0.82 |
| heptanal | 6.01 | 1.81 |
| octanal | 2.38 | 0.21 |
| nonanal | 9.80 | 1.07 |
| 2tr-nonenal | 0.94 | 0.05 |
| pentanon-2 | 0.00 | |
| heptanon-2 | 0.73 | 0.73 |
| nonanon-2 | 0.36 (2 analyses) | 0.08 |
| undecanon-2 | 0.09 | 0.04 |
| tridecanon-2 | 0.20 (2 analyses) | 0.17 |

The oxidized lard was found to have a peroxide value of 9.1 and an anisidine value of 7.3.

EXAMPLE 9

0.300 kg of the flavour concentrate obtained in Example 3 was melted with the aid of a microwave and steam distilled in a 3-necked-roundbottomed 1 l. flask. 500 of condensate was collected in a bottle, cooled in an ice-/water mixture, containing 30 g of medium chain triglyceride oil. After separating off the aqueous phase, a strongly flavoured oil (9A) was obtained. Another 500 ml of condensate was collected in a cooled bottle containing 30 g medium chain triglyceride oil, but this oil (9B) only had a weak flavour and is not suitable for flavouring.

The flavoured oil 9A was analysed using the TCT method described in Example 3:

| Compound | Conc. (ppm) | S.D. |
|---|---|---|
| Pentanal | 17.3 | 3.3 |
| Hexanal | 6.1 | 1.2 |
| Heptanal | 22.7 | 3.9 |
| Octanal | 1.5 | 0.3 |

-continued

| Compound | Conc. (ppm) | S.D. |
|---|---|---|
| Nonanal | 4.5 | 1.8 |
| 2tr-Nonenal | 2.7 | 0.9 |
| Pentanone-2 | 9.4 | 8.9 |
| Heptanone-2 | 30.4 | 22.7 |
| Nonanone-2 | 19.5 | 13.2 |
| Undecanone-2 | 5.5 | 17.7 |
| Tridecanone-2 | 1.1 | 26.3 |

500 ppm of the flavoured MCT oil was used to flavour a margarine which also contained 60 ppm of a commercially available flavour concentrate. The product was compared with a margarine of the same composition, but containing no flavoured MCT oil. The product containing the flavoured MCT oil was clearly preferred over the other margarine product.

EXAMPLE 10

Ice cream A was prepared in a conventional manner from the following ingredients:

| Ingredient | % by weight |
|---|---|
| Butter | 12.05 |
| Skim milk powder | 10.0 |
| Sugar | 13.6 |
| Glucose syrup | 2.5 |
| Stabiliser/emulsifier | 0.5 |
| Water | 61.3 |
| Flavour | 0.04 |

Ice cream B was made using the same ingredients as in spread A, with the exception that butter was replaced by 9.65 wt. % butter oil and 2.40 wt. % water. Ice cream B was found to have clearly worse flavour than ice cream A, which indicates that the aqueous phase of butter contains flavour compounds which contribute significantly to the flavour of ice cream. If 5 wt. % of the butter oil of ice cream B is replaced by the mildly oxidized butterfat of Example 3 the flavour of the ice cream is improved and resembles that of ice cream A.

Ice cream D was prepared from the same ingredients as ice cream B, with the exception that the butteroil was replaced by 9.15 wt. % deodorized coconut oil and 0.5 wt. % of the mildly oxidized butterfat of Example 3. The product obtained had a pleasant flavour, a fresh taste and a very positive aftertaste, although the flavour was slightly less creamy than that of ice cream A.

EXAMPLE 11

A non-dairy cream A was produced in a conventional manner, including the preparation of a premix and an open steam treatment at 150° C., from the following ingredients:

| Ingredient | % by weight |
|---|---|
| Coconut oil | 22.5 |
| Hardened palm kernel oil | 13.5 |
| Triodan 55 (polyglycerol ester) | 0.4 |
| Beta carotene | 0.02 |
| Skim milk powder | 7.0 |
| Guar gum | 0.12 |
| Water | to 100% |

A non-dairy cream B was produced in the same manner and from the same ingredients as cream A, with the exception that 1 wt. % of mildly oxidized butterfat according to Example 3 was included, replacing 1 wt. % fat.

Cream B was found to have a substantially better flavour than cream A. Addition of additional flavour compounds was found to be beneficial as it can give cream B an even more balanced flavour.

EXAMPLE 12

Peanut oil having a peroxide value of 8.5 was mildly oxidized in the same way as the butterfat in Example 3, except that 400 mg of the mixed tocopherols were utilized. The C* for the combination of peanut oil and tocopherol used, was found to be 764 ppm. The peroxide value of the mildly oxidized oil was found to be 37.

The mildly oxidized peanut oil was dissolved into deodorized soybean oil at a concentration of 2 wt. %. The product so obtained had a flavour resembling that of the original peanut oil.

What is claimed is:

1. Process for preparing a flavour concentrate by mildly oxidizing a fat-containing composition, comprising: (a) adding an anti-oxidant to a composition comprising at least 60 wt. % fat selected from the group consisting of butterfat, animal fat, olive oil, sesame oil, peanut oil, and salmon oil, wherein the concentration level of the anti-oxidant, calculated on the fat, is at least such that the anti-oxidant when added to the fat utilized in the preparation of the flavour concentrate, increases the induction period of the fat by a factor of at least 1.5, and (b) keeping the composition in the presence of at least 2 wt. % of water and in the presence of the anti-oxidant, at a temperature of more than 50° C. and at most the boiling temperature of the water under the conditions applied, during a period of time ranging from 0.5 hours to 1 week.

2. Process according to claim 1, wherein the process is carried out in an essentially closed system.

3. Process according to claim 1, wherein the fat-containing composition contains at least 1% salt by weight of the water.

* * * * *